US012333475B2

(12) United States Patent
Dearing

(10) Patent No.: US 12,333,475 B2
(45) Date of Patent: Jun. 17, 2025

(54) SYSTEMS AND METHODS FOR DISTRIBUTING ITEMS WITHIN A DISTRIBUTION NETWORK

(71) Applicant: United States Postal Service, Washington, DC (US)

(72) Inventor: Stephen M. Dearing, Herndon, VA (US)

(73) Assignee: United States Postal Service, Washington, DC (US)

( * ) Notice: Subject to any disclaimer, the term of this patent is extended or adjusted under 35 U.S.C. 154(b) by 766 days.

(21) Appl. No.: 17/212,942

(22) Filed: Mar. 25, 2021

(65) Prior Publication Data

US 2021/0304116 A1 Sep. 30, 2021

Related U.S. Application Data

(60) Provisional application No. 63/000,026, filed on Mar. 26, 2020.

(51) Int. Cl.
| | | |
|---|---|---|
| *G06Q 10/083* | (2024.01) | |
| *B65G 1/137* | (2006.01) | |
| *G06K 7/14* | (2006.01) | |
| *G06Q 10/08* | (2024.01) | |

(52) U.S. Cl.
CPC ......... *G06Q 10/083* (2013.01); *B65G 1/1371* (2013.01); *B65G 1/1373* (2013.01); *G06K 7/1413* (2013.01); *G06Q 10/08* (2013.01)

(58) Field of Classification Search
CPC .... B65G 1/1371; G06Q 10/08; G06Q 10/083; G06Q 10/0833
See application file for complete search history.

(56) References Cited

U.S. PATENT DOCUMENTS

| | | | |
|---|---|---|---|
| 9,692,738 | B1 | 6/2017 | Wenneman et al. |
| 2002/0013744 | A1 | 1/2002 | Tsunenari et al. |
| 2005/0055285 | A1* | 3/2005 | Myrick ................ G06Q 10/10 705/28 |
| 2005/0060164 | A1* | 3/2005 | Eli Berl Illion ..... G06Q 10/083 705/28 |
| 2006/0149577 | A1 | 7/2006 | Stashluk et al. |
| 2010/0131420 | A1 | 5/2010 | Williams |
| 2012/0166296 | A1 | 6/2012 | Hammond et al. |
| 2013/0262251 | A1 | 10/2013 | Wan et al. |

(Continued)

FOREIGN PATENT DOCUMENTS

GB    2552329 A    1/2018

OTHER PUBLICATIONS

International Search Report & Written Opinion dated Sep. 4, 2019 in International Application No. PCT/US2019/038957 filed Jun. 25, 2019.

*Primary Examiner* — Timothy R Waggoner
(74) *Attorney, Agent, or Firm* — Knobbe, Martens, Olson & Bear, LLP

(57) ABSTRACT

Systems and methods for shipping items using codes existing on packaging of items is described. Systems and methods do not require a shipping label or additional codes to be placed on an item, thus eliminating the box-in-a-box situation that frequently occurs. The systems use the existing codes, such as UPC, SKU, serial numbers, etc., and utilize order information and distribution network information to move and track items through the distribution network to delivery.

20 Claims, 5 Drawing Sheets

(56) References Cited

U.S. PATENT DOCUMENTS

| | | |
|---|---|---|
| 2014/0006224 A1 | 1/2014 | Grigg et al. |
| 2014/0058972 A1 | 2/2014 | Gventer et al. |
| 2014/0258098 A1 | 9/2014 | Felix |
| 2014/0279668 A1 | 9/2014 | Lievens et al. |
| 2014/0374478 A1* | 12/2014 | Dearing ............... G06Q 10/087 235/385 |
| 2015/0186841 A1 | 7/2015 | Sar et al. |
| 2016/0140487 A1 | 5/2016 | Tibbs |
| 2016/0350757 A1 | 12/2016 | Bolling et al. |
| 2017/0183158 A1* | 6/2017 | Zhu ....................... G05D 1/692 |
| 2018/0107978 A1 | 4/2018 | Drey |
| 2018/0144301 A1 | 5/2018 | Engel et al. |
| 2018/0349846 A1 | 12/2018 | Sever et al. |

\* cited by examiner

SYSTEMS AND METHODS FOR DISTRIBUTING ITEMS WITHIN A DISTRIBUTION NETWORK

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claims the benefit of priority to U.S. Provisional Application No. 63/000,026, filed Mar. 26, 2020, the entire contents of which are hereby incorporated by reference.

BACKGROUND

The current disclosure relates to the field of distributing items within a distribution network including distributing items without using a specialized or specific shipping box, packaging, or label.

SUMMARY

In one aspect described herein, a system for processing a distribution item comprises item processing equipment configured to receive a plurality of distribution items and to read a code on each of the plurality of distribution items, the item processing equipment having a plurality of destination locations therein; a memory configured to store a plurality of codes and a plurality of order records, wherein each of the plurality of order records is associated with one of the plurality of codes and is associated with one of the plurality of distribution items; and a processor configured to: receive, from the item processing equipment, a code on one of the plurality of distribution items; query the memory to identify an order record associated with the received code; obtain, from the identified order record, an intended delivery point; and cause the item processing equipment to move the one of the plurality of distribution items to the one of the plurality of destination locations in the item processing equipment associated with the intended delivery point.

In some embodiments, the plurality of codes comprise UPCs or SKUs.

In some embodiments, each of the plurality of order records comprises an indication of whether an additional identifier exists for the associated one of the plurality of distribution items.

In some embodiments, the processor is further configured to determine, whether an additional identifier exists for the identified order record.

In some embodiments, the processor is further configured to cause the item processing equipment to apply the additional identifier to the one of the plurality of distribution items.

In some embodiments, the additional identifier is an alphanumeric string.

In some embodiments, the additional identifier is an address.

In some embodiments, the processor is further configured to generate a pseudocode and to associate the pseudocode with the identified order record.

In some embodiments, the processor is further configured to receive, from a user via a user interface, the pseudocode, and in response to receiving the pseudocode, provide tracking information for the one of the plurality of distribution items associated with the identified order record.

In some embodiments, the processor is further configured to receive, from a sender interface, the plurality of codes and the plurality of order records.

In another aspect described herein, a method for processing distribution items comprises receiving, in item processing equipment, a plurality of distribution items, wherein the item processing equipment comprises a plurality of destination locations therein; reading, in the item processing equipment, a code on each of the plurality of distribution items; storing, in a memory, a plurality of codes and a plurality of order records, wherein each of the plurality of order records is associated in the memory with one of the plurality of codes and with one of the plurality of distribution items; receiving, from the item processing equipment, a code on one of the plurality of distribution items; querying, via a processor, the memory to identify an order record associated with the received code; obtaining, from the identified order record, an intended delivery point; and moving, via the item processing equipment, the one of the plurality of distribution items to the one of the plurality of destination locations in the item processing equipment associated with the intended delivery point.

In some embodiments, the plurality of codes comprise UPCs or SKUs.

In some embodiments, each of the plurality of order records comprises an indication of whether an additional identifier exists for the associated one of the plurality of distribution items.

In some embodiments, the method further comprises, determining whether an additional identifier exists for the identified order record.

In some embodiments, the method further comprises, applying, via the item processing equipment the additional identifier to the one of the plurality of distribution items.

In some embodiments, the additional identifier is an alphanumeric string.

In some embodiments, the additional identifier is an address.

In some embodiments, the method further comprises generating a pseudocode and associating the pseudocode with the identified order record.

In some embodiments, the method further comprises receiving, from a user via a user interface, the pseudocode, and in response to receiving the pseudocode, providing tracking information for the one of the plurality of distribution items associated with the identified order record.

In some embodiments, the method further comprises receiving, from a sender interface, the plurality of codes and the plurality of order records.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

Figure 1:
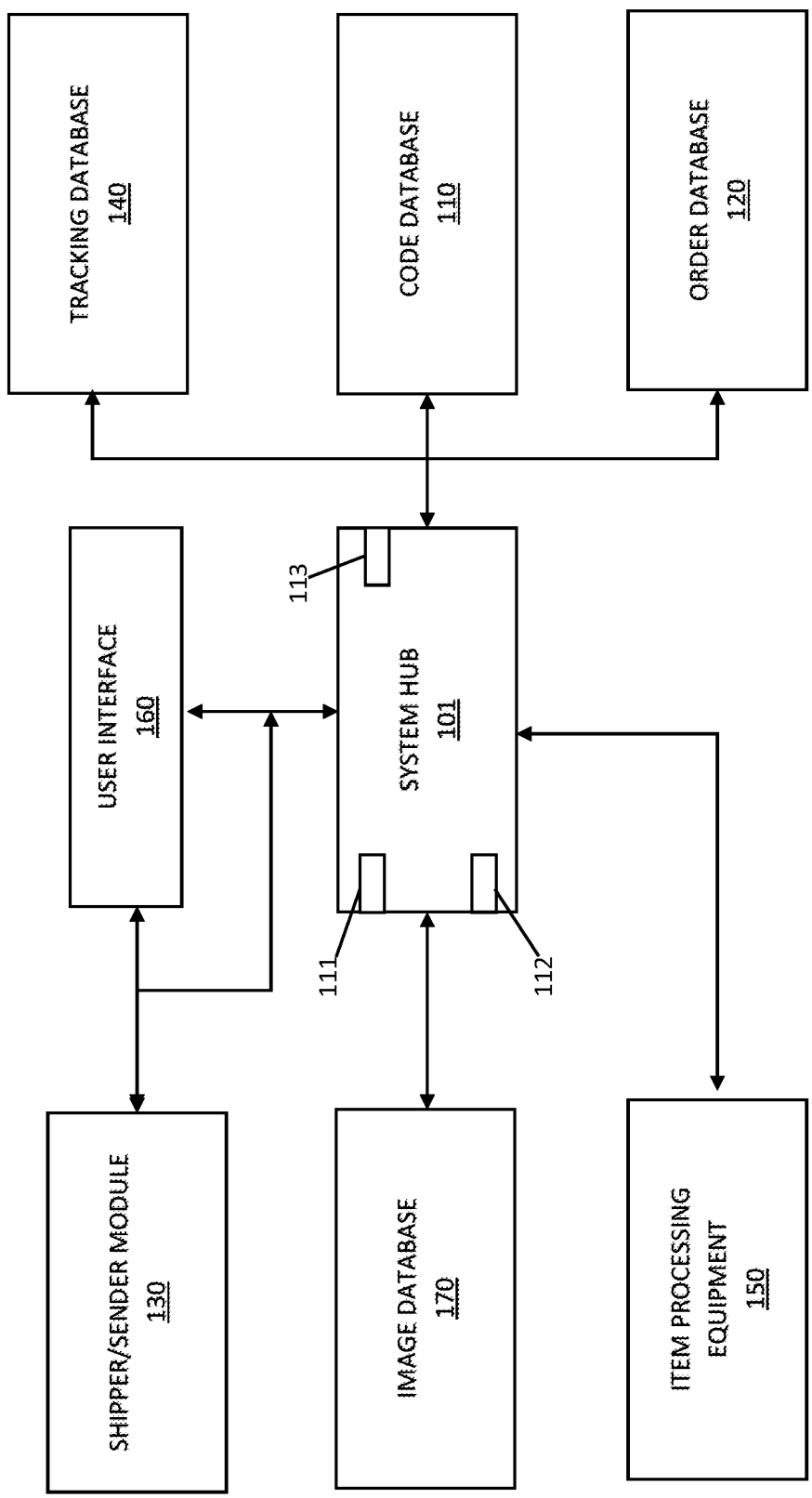
FIG. 1 is a block diagram depicting an embodiment of a system for distributing items within a distribution network.

Various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

Reference in the specification to "one embodiment," "an embodiment," or "in some embodiments" means that a particular feature, structure, or characteristic described in connection with the embodiment is included in at least one embodiment of the invention. Moreover, the appearance of these or similar phrases throughout the specification does not necessarily mean that these phrases all refer to the same embodiment, nor are separate or alternative embodiments necessarily mutually exclusive. Various features are described herein which may be exhibited by some embodiments and not by others. Similarly, various requirements are described which may be requirements for some embodiments but may not be requirements for other embodiments.

As used herein, an item can be a parcel, a package, an envelope, a flat, a mailpiece, a box, a suitcase, and the like, that can be transported from one location to another by a distribution entity. An item can also be a product or good which can be transported within a parcel, package, envelope, etc. A distribution entity may be an entity engaged in transporting items from one location to another, such as the United States Postal Service (USPS), another commercial carrier, a storage facility, a fulfillment warehouse, a luggage sorting facility, or any other similar facility, company, or entity.

Items are moved within distribution networks in local areas, in regions, and across the country. As an example, the United States Postal Service (USPS) transports items in a distribution network. Items are identified by a shipping label, a barcode, or other identifier that includes customer information, destination, unique identifiers, etc. These identifiers have been previously used when processing the item by deliver personnel, item processing equipment, transportation, retailers, sellers, shippers, etc., in order to facilitate the distribution and delivery of items. Frequently, when consumers or item purchasers order items from a retailer or seller, the item has or is in a box or other packaging provided by the manufacturer of the item. The retailer or seller, when sending the item through a distribution network, such as the USPS, puts the item with its manufacturer's packaging in another box, such as a shipping box, or other packaging. This box-in-a-box scenario can be wasteful of packaging material, can increase the time for preparing an item for shipment, and can limit the accessibility of the distribution network to those who do not have the means to package an item to send. This can be the case for sales and item returns. As used herein, the term item can refer to an article, or it can refer to the box in which the article is contained, or it can refer to both the box and the article together.

These items in manufacturer's packaging often have a computer readable code thereon, such as a barcode. The computer readable codes can be SKUs (stock-keeping unit), UPCs (universal product code), serial numbers, and the like. A distribution network, such as the USPS, can advantageously provide systems and processes which will enable a customer to send an item, through the distribution network using the existing computer readable codes on items.

An exemplary process can be as follows: A seller or shipper of an item wishes to send an item without using additional packaging and/or without a specific shipping label. The seller identifies a computer readable code, such as a SKU, UPC, serial number, etc., that exists on the packaging. The codes for a plurality of items can be stored in a code database. Data can be transferred between the shipper and the distribution network via one or more APIs or via any other desired method. The distribution network receives the computer readable codes for one or more items and associates item information with the codes. When a customer orders one of the items, an order record is created, either by the shipper, the distribution network, or another entity. The order record is associated with the computer readable code from the item and with the intended recipient's information, and other information as required. The item is provided to the distribution network, where it is ingested or received into the network. The item can be scanned at ingestion at a distribution network facility, or can be scanned downstream on item processing equipment. When the item is scanned, that is, when the SKU, UPC, etc. on the packaging is scanned, the distribution network accesses the code database to determine which type of item has been scanned. In some embodiments, when an item is received, is handed to a distribution network resource, is picked-up, dropped, deposited, etc., data can be exchanged between the sender/shipper and the distribution network. The data exchange can occur upon a scan event, or can occur as part of the pick-up, transfer, or drop-off, or deposit process. The data exchange can occur at a time other than the actual time of pick-up, such as at the beginning of the day, at the beginning of shift, or at another set time. The data exchange can be done via a manifesting process and/or can occur via APIs, or via another desired process. The sender/shipper can send order information, recipient information, item information, including any scannable codes, delivery instructions, or other desired information during the data exchange. The distribution network can use the exchanged data to generate, supplement, or modify order records, item records, or other information as described herein.

The distribution network then accesses information such as orders from the order database that include the item identified from the scan, and/or from the data exchange. The distribution network uses tracking data and customer data to determine a next location for sending the item, such as another facility, a unit delivery facility or delivery to the intended recipient.

A similar process can occur when a customer desires to return an item. These and other embodiments will be described in greater detail herein.

A distribution network as described herein may comprise multiple levels. For example, a distribution network may comprise processing facilities such as regional distribution facilities, hubs, and unit delivery facilities, and other desired levels. For example, a nationwide distribution network may comprise one or more regional distribution facilities having a defined coverage area (such as a geographic area), designated to receive items from intake facilities within the defined coverage area, or from other regional distribution facilities. The regional distribution facility can sort items for delivery to another regional distribution facility, or to a hub level facility within the regional distributional facility's coverage area. A regional distribution facility can have one or more hub level facilities within its defined coverage area. A hub level facility can be affiliated with a few or with many unit delivery facilities, and can sort and deliver items to the unit delivery facilities with which it is associated. In the case of the United States Postal Service, the unit delivery facility may be associated with a ZIP code. The unit delivery facility receives items from local senders, and from hub level facilities or regional distribution facilities. The unit delivery facility also sorts and stages the items intended for delivery to destinations within the unit delivery facility's coverage area. The unit delivery facility may be associated with one or more delivery routes.

In a distribution network, items for delivery are brought into a processing facility. As used herein in, processing facility may refer to a regional distribution facility, a hub, or a unit delivery facility. In the processing facility, items are processed in preparation for the next stage in the delivery scheme. Incoming items into a processing facility may not be sorted or sequenced, and may be randomly ordered, arranged, inducted into sorting equipment, or processed in any order. Therefore, sorting and/or sequencing is required at the processing facility to sort and sequence items according to the next stage in the delivery scheme. Where the processing facility is a unit delivery facility, for example, the items must be sorted and sequenced into delivery routes and into delivery sequence order.

Items can be sorted according to item type, delivery end point, class of service, or any other criteria. Items which are intended for delivery within a defined geographic area near the processing facility, or intended for delivery to a particular destination or plurality of destinations, can be sorted by separating these items from items with other, different delivery end points. Items intended for delivery to a destination outside of the defined geographic area, particular destination or plurality of destinations can be processed and/or sent to another processing facility nearer their delivery end points.

A processing facility, such as a unit delivery facility, may service one or more delivery routes, and may be serviced by one or more delivery resources, including, for example, carriers, vehicles, computing devices, and the like.

FIG. 1 is a block diagram depicting an embodiment of a system for distributing items within a distribution network. A system 100 for distributing items includes a system hub 101, a code database 110, an order database 120, a shipper/sender module 130, a tracking database 140, item processing equipment 150, a user interface 160 and an image database 170.

The system hub 101 may comprise or be a component of a processing system implemented with one or more processors. The system hub 101 may be a network of interconnected processors housed on one or more terminals. The one or more processors may be implemented with any combination of general-purpose microprocessors, microcontrollers, digital signal processors (DSPs), field programmable gate arrays (FPGAs), programmable logic devices (PLDs), controllers, state machines, gated logic, discrete hardware components, dedicated hardware finite state machines, or any other suitable entities that may perform calculations or other manipulations of information. The system hub 101 may comprise a processor 111 such as, for example, a microprocessor, such as a Pentium® processor, a Pentium® Pro processor, a 8051 processor, a MIPS® processor, a Power PC® processor, an Alpha® processor, a microcontroller, an Intel CORE i7®, i5®, or i3® processor, an AMD Phenom®, A-Series®, or FX® processor, or the like. The processor 111 typically has conventional address lines, conventional data lines, and one or more conventional control lines. The processor 111 may be in communication with a processor memory 112, which may include, for example, RAM memory, flash memory, ROM memory, EPROM memory, EEPROM memory, registers, hard disk, a removable disk, a CD-ROM, or any other form of storage medium known in the art. The processor memory 112 may include, for example, software, at least one software module, instructions, steps of an algorithm, or any other information. In some embodiments, the processor 111 performs processes in accordance with instructions stored in the processor memory 112.

The system hub 101 comprises a system memory 113 configured to store information, such as delivery object assignments, ownership information and the like. The system memory 113 may comprise a database, a comma delimited file, a text file, or the like. The system hub 101 is configured to coordinate and direct the activities of the components of the system 100, and to coordinate generating delivery object associations and delivery object ownership data.

The system hub 101 is in communication with a code database 110. In some embodiments, the code database 110 may comprise a processor, memory, databases, address and control lines, and other components similar to those described herein for the system hub 101. In other embodiments, the code database 110 may be configured to use the processor, memory, databases, address and control lines, and other components of system hub 101, or a combination of its own components and the system hub 101's components.

The code database 110 stores computer readable codes and item information. In some embodiments, the code database 110 stores computer readable codes, such as SKUs, UPCs, serial numbers, and other codes found on items. The code database 110 also stores item information associated with those codes, such as an identification of the item, item type, item size, item weight, whether an item is perishable, handling instructions, and other desired information. The code database is populated, for example, with the SKUs and UPCs for hundreds, thousands, tens of thousands, etc. of items or types of items. The codes in the code database 110 can be found on packing from item manufacturers. In some cases, the SKUs and UPCs are not related to a specific item, that is, with a specific instance of an item, but are generally associated with items or types of items. For example, a book, a box of diapers, etc., may have a SKU or UPC thereon. The SKU or UPC is stored in the code database 110 and is associated with item information for the book or the box of diapers. The code database 110 may not, in some embodiments, store information related to any particular instance of a book, or any particular box of diapers.

In some embodiments, for example, in the case of electronics, appliances, software, and other items, the item packaging may include a serial number thereon. The serial numbers can be encoded in barcodes or other computer readable codes. Serial number can be unique and can uniquely identify a particular item or particular instance of an item. The serial numbers and the codes can be stored in the code database 110 and are associated with item information. In this example, where the serial number uniquely identifies a specific item or specific packaging, the code database 110 stores the code and associates it with unique item information.

In some embodiments, the code database 110 is populated with codes and item information by information received from a variety of sources. For example, in some embodiments, the code database 110 receives code information and item information and the associations from the shipper/sender module 130 or from an entity via the user interface 160. In some embodiments, a user can input the codes via a user interface either manually or via an automatic system. In some embodiments, a shipper or sender, such as a manufacturer or retailer, can provide code information and item information the code database 110 by submitting the information to the system hub 101 which then stores the information in the code database 110.

The order database 120 is in communication with the system hub 101. In some embodiments, the order database 120 may comprise a processor, memory, databases, address and control lines, and other components similar to those described herein for the system hub 101. In other embodiments, the order database 120 may be configured to use the processor, memory, databases, address and control lines, and other components of system hub 101, or a combination of its own components and the system hub 101's components.

The order database 120 receives and stores order information and recipient information. The order information can be information generated by a shipper, sender, or retailer (which terms can be used interchangeably) that a customer ordered an item. The order database 120 can store the order information in an order record. The order record can include the computer readable code of the item or an association with a computer readable code in the code database 110. The order record can also include information for the customer, such as the delivery point of the intended recipient, any special handling instructions, item quantity, and any other desired information.

The sender/shipper module 130, as noted above, can be an access point for connecting the system hub 101 to a computer system, or other feature of a computing network or system of a shipper, sender, retailer, manufacturer, etc. The shipper/sender module 130 can include APIs for exchanging data between senders, shippers, retailers, manufacturers, and the system hub 101. For example, a manufacturer, seller, etc. of items sends computer readable codes and associated item information to the system hub 101 via the shipper/sender module 130. The system hub 101 then stores this information in the code database 110. In another example, when a retailer sells an item that is to be delivered, the sale and order information is transmitted to the system hub 101 via the shipper/sender module 130. The retailers, shippers, sellers send order information to the system 100 via the shipper/sender module 130.

The user interface 160 can provide similar functionality and can be used, for example, by an entity wishing to send an item, such as a return, or to send an item to another location. The user interface 160 can be, for example, a website, a mobile application, etc., where a relatively small entity, or an entity which does not have a high volume of items to ship, can access the system 100. The user interface 160 can receive a code from the item, for example, via a scan or an image of the item. In some embodiments, the user can look up the code for a particular item, or can select an item based on options or search functionality provided via the user interface 160 using codes from the code database 110. A user can provide order information, such as the address or delivery point of an intended recipient, and any other handling information for an item.

The tracking database 140 is in communication with the system hub 101. The tracking database 140 is also in communication with other systems of the distribution network including tracking databases and equipment. The tracking database 140 includes information that is generated as items are processed in the distribution network, such as when items are ingested, processed or sorted, scanned, handled, and delivered. Thus, the system hub 101 can access tracking information for items at any time as the items move through the distribution network. The tracking database may cross-reference, point to, and/or have associations with orders and order records in the order database 120. In some embodiments, the tracking database 140 can include a proposed path or determined path an item will follow through the distribution network, including high and low level facilities the item will or is expected to pass through. The tracking database 140 can also include an estimated or proposed delivery day, time, etc., for the items.

In some embodiments, the code database 110 and the order database 120 can be a single database, or can function together, or can together comprise a network of computers, processors, memories, etc., In some embodiments, the order database 120 and the tracking database 140 can be a single database or can function together, or can together comprise a network of computers, processors, memories, etc. In some embodiments, the code database 110, the order database 120 and the tracking database 140 can be a single database, a single computer system, or can together comprise a network of computers, processors, memories, etc. Functions of these databases can be delineated as described above, or can be adjusted, distributed, or allocated across the databases and the system hub 101 by a person of skill in the art without departing from the scope of the current disclosure.

The item processing equipment 150 has components that are in communication with the system hub 150. The item processing equipment 150 can be equipment which scans, sorts, moves, unloads, loads, or otherwise handles items. In some embodiments, the item processing equipment can be a delivery bar code sorter (DBCS), a delivery unit sorter or automated delivery unit sorter (ADUS), small parcel sorting system (SPSS), high throughput parcel sorter, automated parcel and bundle sorter, or other type of parcel sorting system. The item processing equipment 150 comprises a reader, scanner, camera, or other component capable of imaging or scanning items being processed, in order to read codes on items and/or capture images of codes on items, and comprises or is in communication with a processor to read the codes from a captured image of the item. The item processing equipment 150 includes a variety of pieces of equipment throughout the distribution network. When the item processing equipment 150 processes an item, the item processing equipment generates can information or tracking information which includes in identifier of the item processing equipment 150, the location of the equipment within the distribution, time and date of scan, and other desired information. The system hub 101 receives the scan and tracking information, and the system hub 101 communicates the information to the tracking database 140.

The image database 170 is in communication with the system hub 101 and the item processing equipment 150. The image database 170 receives images of items as they are processed on the item processing equipment 150. The images of the items can be stored and an association can be stored between an order record and an image of the item as the item is processed.

Figure 2:
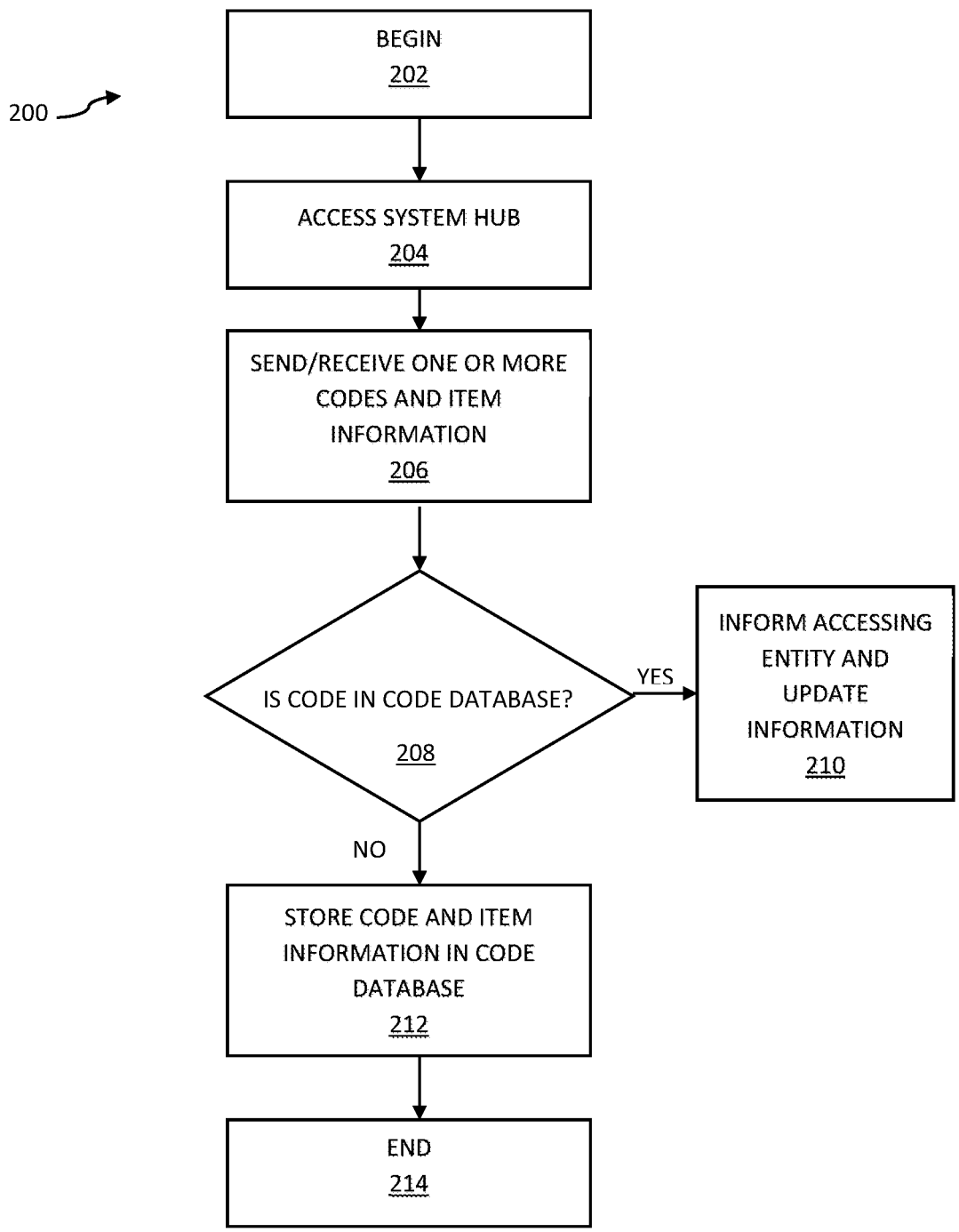
FIG. 2 is an exemplary flow diagram of a process for providing codes and item information.

As noted above, a distribution network can use computer readable codes on the manufacturer's packaging, or otherwise on the item as an identifier to use with as an item is processed in the distribution network. To do so, the distribution network must have access to the various codes that can be on an item. A process for ingesting this information into distribution network can be similar to that depicted in FIG. 2. FIG. 2 depicts an exemplary process for ingesting information into the system 100. A process 200 begins in step 202. The process 200 moves to step 204, wherein a manufacturer, retailer, seller, shipper, or any other party can access the system 200. This access can be accomplished via the shipper/sender module 130, the user interface 160, or through another type of data exchange. The shipper/sender module 130 can have APIs which allow the system 100 to communicate with programs, interfaces, networks, etc., of a manufacturer, shipper, retailer, etc. Access can be provided by the system hub 101 by setting up an account for individual shippers, retailers, merchants, etc., or can be accessed by any entity desiring to provide codes and information to the system.

The process moves to step 206, wherein the accessing entity, such as a manufacturer, retailer, seller, shipper, etc. provides or sends one or more computer readable codes and the associated item information. For example, a manufacturer, distributor, retailer, etc. can submit a SKU or a UPC, or other computer readable code, such as a barcode to the system 100. The accessing entity also provides item information, such as descriptive information, handling instructions, and the like. The SKU, UPC, or other code is stored in the code database 110 along with the information. In one example, a manufacturer can send the SKU or UPC or other code for an item such as a box of diapers. The manufacturer will also provide a text description of the item, such as "diapers, 72 count", and any other details. The manufacturer can also provide dimensions of the box, the weight of the box, manufacture date, and any other desired information.

In another example, a manufacturer of cellular phones may access the system 100 and provide an electronic serial number (ESN) along with a UPC and/or SKU. The ESN, in this case, is a unique identifier, whereas a UPC or a SKU may not be. The item information will be associated with the ESN and stored in the code database 110.

In some embodiments, the accessing entity can submit a few, several, or many codes, for a variety of products. In some embodiments, an accessing entity can submit a batch of ESNs.

The process moves to decision state 208, wherein it is determined whether the code and item information is already stored in the code database. The system hub 101 queries or checks the code database for duplicative information, or a duplicate code, UPC, SKU, ESN, etc. If the system hub 101 detects a duplicate code, the process moves to step 210, wherein the system hub 101 can send to the accessing entity, via the shipper module 130, the user interface 160, or via other method to inform the accessing entity of the duplication, and to request whether the item information or code or both has updated information. The accessing entity can indicate whether to ignore the duplicate code, or to update the item information associated with the code in the code database 110. In some embodiments, the accessing entity can send updated information and alert the system hub 101 that updated information is being provided, and decision state 208 need not be performed.

If the determination in decision state 208 is that the codes are not duplicate, the process moves to step 212, wherein the system hub 101 stores the received codes and item information and the associations therebetween in the code database 110. The process then moves to step 214 and ends.

Figure 3:
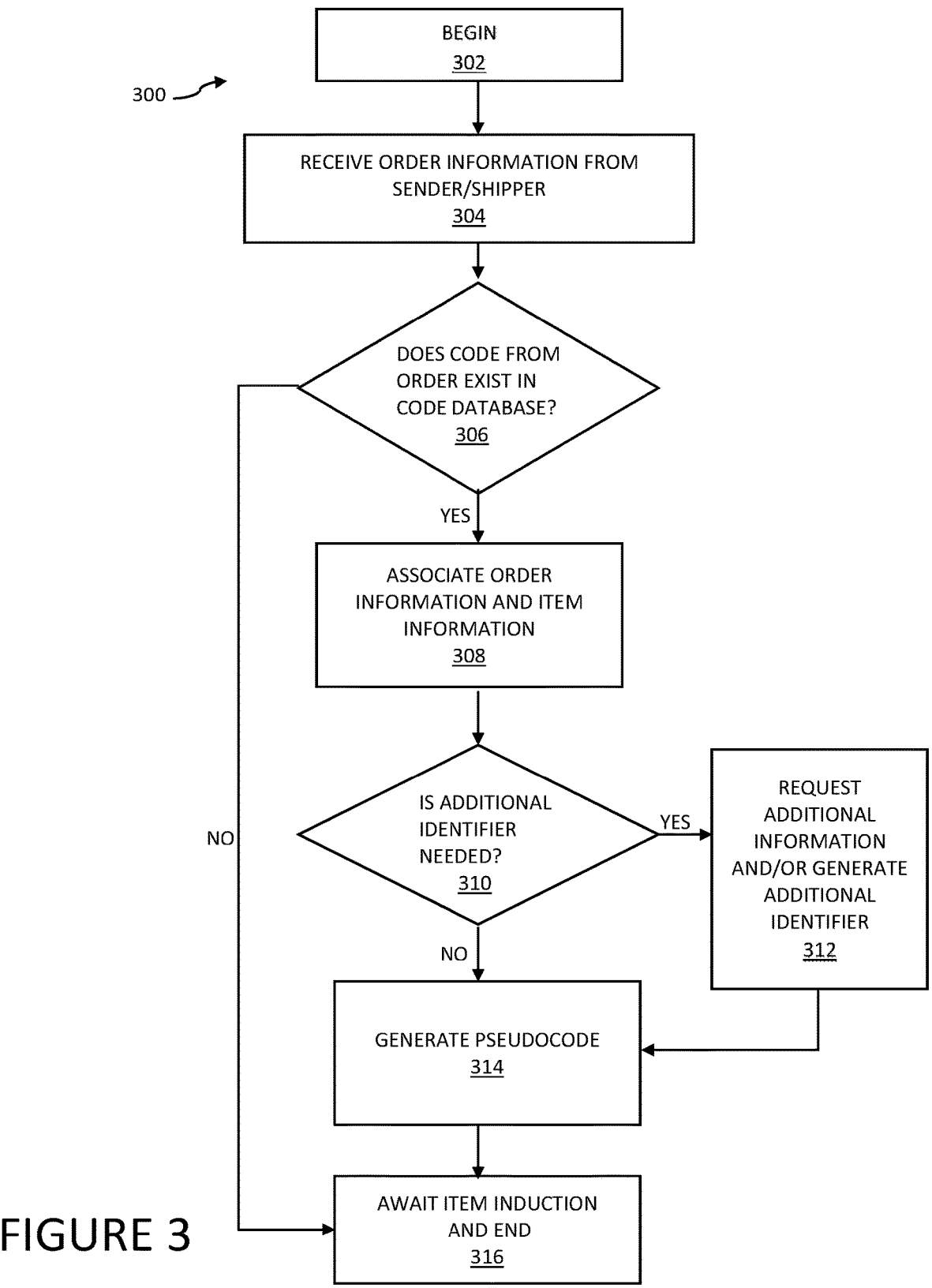
FIG. 3 is an exemplary flow diagram of a process for receiving an order for an item.

FIG. 3 is an exemplary flow diagram of a process for receiving an order for an item. A process 300 begins in step 302. The process 300 moves to step 302, wherein the system 100 receives order information for an item from a seller, sender, shipper, or the like. The term seller used here can refer to senders, shippers, sellers, retailers, manufacturers, or other entities who access the system 100 to provide codes, item information, order information etc. In some embodiments, the order information can be a return authorization from a seller, merchant, sender, etc., and can have an associated order record. The return authorization can include a delivery point, indication of payment, special handling instructions, and the like.

The seller accesses the system 100 via the seller/shipper module 130 or the user interface 160. The seller provides the details of an order. An order can be an item which is to be delivered via the distribution network. The order information provided to the system 100 can include a code, such as a UPC, SKU, serial number, or other code which is located on the item to be sent. The order information can also identify an intended recipient for the item, delivery point information for the intended recipient, shipping requirements, class of service, origination point, for example, the location from where an item is sent, a return address, postage, and other desired information. The order information can include an image of a code on the item provided by a seller.

The system hub 101 creates an order record in the order database 120 and stores the order information in the order record. The order record can include a unique identifier or can be unique to the order information received.

The process 300 moves to decision state 306, wherein the system 100 determines whether a code received as part of the order information or associated with the order information exists in the code database 110. The system hub 101 can query the code database 110 for a code corresponding to the code received in the order information. In some embodiments, the order information can include the item information and the code, and thus this decision state may be optional.

If the code from the order does not exist in the code database 110, the system 100 treats the order like other orders, and the process moves to step 316, wherein the system 100 awaits item induction, and ends.

If the code received in the order information does have a corresponding code and item information in the code database 110, the process 300 moves to step 308, wherein the system hub 101 associates the item information from the code database 110 with the order information in the order database 120.

In some embodiments, decision state 306 is not performed, and the system 100 receives item information and a code in the order information. In this case, the system hub 101 can create an entry for the code and associated item information in the code database 110, when the code was not previously in the code database 100.

The process moves to decision state 310, wherein the system 100 determines whether an additional identifier or additional information is needed. The system 100 evaluates the order information, including the origin and the intended delivery point and a identifies a proposed path, route, or other logistics for how the item will be picked up and delivered. If the information provided in the order information is insufficient to determine how to pick up and deliver the item, the system 100 requests additional information. The system hub 101 further analyzes the code and the item information associated with the code to determine whether the item needs a unique identifier or code to be applied to the item in order to uniquely identify the item in the distribution network. For example, if the item is identified only by a SKU or UPC, or other code which does not uniquely identify the item to item processing equipment, the system hub 101 can determine that an additional identifier is needed. The system 100 may request In some embodiments, if the code does not uniquely identify the item, the system hub 101 evaluates additional considerations to determine whether an additional identifier is needed. For example, where the code does not uniquely identify the item, and the pick-up and delivery locations are within a certain geographic area, such as an area serviced by a single unit delivery facility, a certain geographic distance, or if the pickup and delivery are to be or can be accomplished in the same day, or on a next-day basis, then the system hub 101 can determine that no additional identifier is needed. In another example, where the code does not uniquely identify the item, the system hub 101 evaluates the number of that item that are similar or share the code received. For instance, when the item is a box of diapers, and the code is a UPC or a SKU, the system hub 101 determines the feasibility of induction, processing, and delivery of the item without a unique identifier on the item. In a case where there is only one, or a few, of if there are very many similar items being delivered in a local area, or within a defined area, the system hub 101 may determine that an additional identifier is not required. If there are a certain number of items, the system hub 101 may determine that one or more of the similar items should have an additional identifier generated in order to uniquely identify the items. If there are a large number of items that are to be delivered to a large geographic area, the system hub 101 can determine that for items which travel a long distance from origination to delivery point should have a unique identifier applied thereto. There are more situations or circumstances in which the system hub 101 can determine that an additional identifier should be created and applied to the item, and the examples provided here should not be limiting.

If the system hub 101 determines that an additional identifier should be used, the process 300 moves to step 312, wherein the system hub 101 requests additional information and/or generates the additional identifier. The additional identifier can be an alphanumeric string, a barcode, or other computer readable code. The system hub 101 can provide the additional identifier to the user via the shipper/sender module 140 and/or the user interface 160. In some embodiments, the additional identifier can be a delivery point, such as an address of the intended recipient.

In some embodiments, the unique identifier need not be unique to all other identifiers in the system. The system hub 101 can generate an identifier which is unique for all items associated with a particular code. For example, if the code is a SKU or UPC for a box of diapers, and there are 200 such items in the distribution network, the system hub 101 generates an identifier that is unique among the 200 boxes of diapers having the SKU or UPC. Thus, the additional identifier uniquely identifies an item when used in conjunction with a given code on an item. In this way, the additional identifiers do not need to be long codes, complex barcodes, etc., but can be simple, short phrases, words, codes, etc., that a user could easily apply to the item.

The seller can then apply the additional identifier to the item before the item is inducted into the distribution network. In some embodiments, the additional identifier request can comprise a request from the system 100 to the shipper to put the delivery point, such as the address of the intended recipient, on an external surface of the item, such as on the box. This can be written on the box, a label or sticker can be placed on the box, etc.

In some embodiments, for example, the additional identifier can be placed on the item by item processing equipment when the item is inducted into or is scanned somewhere in the distribution network. The system can scan the item identified by the order information and can store the additional identifier. When the item is scanned or processed on item processing equipment, the system 100 can identify the item which needs the additional identifier placed thereon, and the item processing equipment can spray or otherwise apply the identifier, such as an alphanumeric code, number, address, etc., to the item.

If the system hub 101 determines that no additional identifier is needed in decision state 310, or after the additional identifier is generated, the process 300 moves to step 314, wherein the system hub 101 or other component of the system 100 generates a pseudocode. The pseudocode can be the unique identifier of the order record, or can be a unique identifier associated with the order record. The pseudocode can be provided to the seller via the sender/shipper module 130 and/or the user interface 160. The pseudocode identifies the order record and when input by a user, the user can access tracking information and order information. The pseudocode need not be placed physically on the item. The pseudocode can be a short phrase, alphanumeric string, or other simple code so that a user need not input a long, complicated tracking code. To keep the pseudocodes short, for example, 5-6 digits long, the pseudocodes can be valid only for short periods of time, such as transit time for the item, so they can be re-used frequently.

The process 300 moves to step 316, wherein the system 100 awaits induction of the item associated with the order information and ends.

Figure 4:
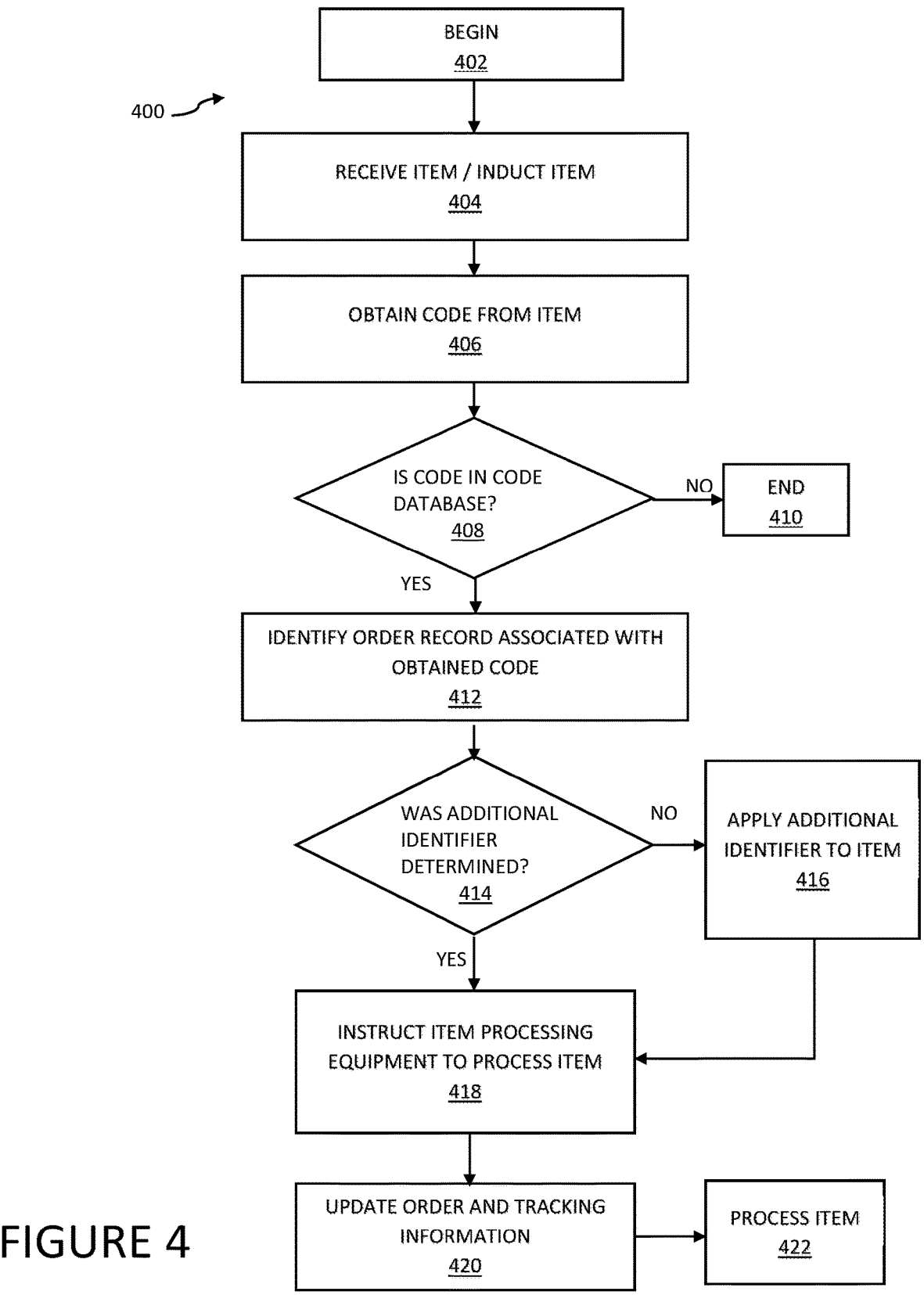
FIG. 4 is an exemplary flow diagram of a process for receiving an item in a distribution network and processing the item for delivery.

FIG. 4 is an exemplary flow diagram of a process for receiving an item in a distribution network and processing the item for delivery. A process 400 begins in step 402. The process moves to step 404, wherein an item is received, ingested, inducted, or otherwise obtained or brought into the distribution network.

This can occur when a delivery resource, such as a carrier, picks up an item at a merchant or retailer or seller location. This can occur when a merchant drops a plurality of items at a distribution network facility, when a sender or seller brings an item to a distribution network facility, such as a post office, or the like. As described herein, the receipt of the item can correspond with a data exchange event for the item.

The process 400 moves to step 406, wherein the code is obtained from the item using item processing equipment 150. This can occur as a carrier picks up an item at a location and scans the code on the item, such as scanning the UPC, SKU, serial number, or other code. If, an additional identifier is present on the item, the carrier can input the additional identifier as well. In some embodiments, the delivery resource takes an image of the item, with the image including the code and the additional identifier, if present. In some embodiments, the item need not be scanned or imaged when it is picked up.

In some embodiments, the code can be obtained when the item is processed at a distribution facility. The item can be scanned at the facility prior on item processing equipment 150 such as by a handheld or automated scanner, or as part of initial processing on item processing equipment 150 such as sorting equipment. The first scanning or imaging of the item can be termed the induction scan. The terms scan and image can be used interchangeably herein, and are used to describe processes for obtaining codes and/or reading a code on the item.

The system hub 101 receives the scan information or receives the image and decodes a barcode, performs OCR, or uses other analysis techniques to read the code on the item. When an image of the item is taken at induction, the image of the item is stored in the image database 170. When the code is read, decoded, etc., the code is associated with the image in the image database. Each entry in the image database can have a unique image record identifier associated therewith. In some embodiments, the image of an item can be taken and associated with the item record. The image can be stored in a memory, for example, in the image database 170, for comparison with a previously received image or with a subsequently received image.

The process 400 moves to decision state 408, wherein the system hub 101 determines if the read code is in the code database 110. If the read code is not in the code database 110, the process 400 moves to step 410 and ends.

If the read code is in the code database 110, the process 400 moves to step 412, wherein the system hub 101 access the item information associated with the code in the code database. The system hub 101 also accesses any associations between the code in the code database and an order record associated with the code. If the code is associated with more than one order record, e.g., a UPC or SKU is scanned, the system 100 can identify a likely order record form the records associated with the code. The likely order can be determined based on the location of the scan event and a comparison to a proposed path or likely path of an item through the distribution network.

The process 400 moves to decision state 414 wherein it is determined whether an additional identifier was generated by the system hub 101 and/or is present on the item as determined by the item processing equipment 150. If an additional identifier was generated and the scan of the code did not identify the additional identifier, the process 400 moves to step 416, wherein the item processing equipment 150 applies the code to the item. In some embodiments, the system hub 101 can instruct the item processing equipment 150 to apply an address to the item, by spraying an address and/or the additional identifier on the item, or by affixing a label, sticker, or other identifier to the item.

If no additional code was generated, or when the code has been applied to the item in step 416, the process 400 moves to step 418, wherein the system hub 101 identifies the intended delivery point from the order record if not previously done. The system hub 101 can instruct the item processing equipment 150 how to process the item based on the order information, including, for example, the intended delivery point, special handling instructions, postage information, and using item information such as item size, weight, etc. The system hub 101 communicates the intended delivery point for the item being processed, and the item processing equipment 150 sorts the item according to the intended delivery point and/or the proposed path through the distribution network determined for the item.

This process can occur multiple times within a processing facility, where the item processing equipment 150 can include one or more machines, forklifts, scanners, and other equipment used to move the item physically through a facility based on the intended delivery point.

The process 400 moves to step 420, wherein the system hub 101 updates the tracking database 140 with the processing information. The system hub 101 updates the tracking record and/or the order record for the item being processed including the machine the item was processed on, time and date of processing, and, in some embodiments, provides a predicted delivery time, or a predicted time of arrival at a next facility. The tracking database 140 can also cross reference or have an association with the order record in the order database 120. In some embodiments, the system hub 101 updates the order database 120 and the tracking database 140.

The process 400 moves to step 422, wherein the item continues through the distribution network. One or more of the steps described in process 400 can occur for the item at subsequent facilities, by delivery resources, such as carriers, as the items are out for delivery, and the like. In a subsequent facility and/or on subsequent item processing equipment 150, when an item is scanned, the system hub 101 can use logic rules to determine an order record to which the scanned item belongs. For example, if there is only one order record associated with particular scanned item, the system hub identifies easily the specific order record and the intended delivery point. However, in a large distribution network, such as the USPS, there may be more than one order record associated with a UPC or SKU. In the case where there is more than one order records associated with a particular type of item, the system hub 101 can select or identify one of the order records to associate with the particular item or scanning instance on the item processing equipment in order to identify the intended delivery location.

The system hub 101 can evaluate all the order records for the scanned item which are active in the system. The system hub 101 can evaluate origination location, the intended delivery point, and the location of the item processing equipment 150 which scanned the item. If, for example, one order record for the scanned item has an origination in Seattle, Washington, and an intended delivery point in San Diego, California, and the item processing equipment is located in Atlanta, Georgia, the system hub 101 can employ logic rules that determine that the order record originating in Seattle is not associated with the item scanned in Atlanta, or that the scan in Atlanta should not be associated with the order record originating in Seattle.

Similarly, the system hub 101 can use logic related to order timing and scan times and dates to determine how to or whether to associate a scanned item with a particular order record. If an item is scanned in a local delivery facility after arriving from a regional distribution facility, which can be determined, for example, by container relationships, vehicle relationships, etc., this can indicate the item is nearing a delivery location. Therefore, the system hub 101 rules would not associate this scanned item with an order record which was placed within one day of the scan, or within some time period of the scan. In this case, the system hub 101 will associate the scanned item with an order that was placed longer ago, and has an intended destination in a local area of the item processing equipment 150 on which the item was scanned. Other logical rules can also apply.

In cases of returns, the system hub 101 can employ additional logic. When an item is scanned on item processing equipment 150, where one of order records identified as corresponding to or being associated with the scanned item is a return authorization, the system can employ the return information to identify the correct order record or item. For example, a return authorization may indicate that a consumer is returning an item which was opened and/or found to be defective. In this case, the item should be delivered to the returns location, and therefore should be treated differently than another item having the same UPC or SKU. As noted elsewhere, in this case the system 100 can generate an additional identifier and the user or returner can place the additional identifier on the item. In some embodiments, however, the system uses order record information and the return authorization information to identify an item. When an item is scanned on item processing equipment, and there is a return authorization associated with the scanned code in the order database 130, the system hub 101 determines that it must use more rigorous logic or processes to ensure the returned item is specifically identified. The system hub 101 evaluates the timing of the item at each step of the process. For example, the system hub 101 evaluates the timing of the return authorization and the scan, the location of the induction scan, location of the item processing equipment scan and the like. The system hub 101 determines based on timing, geography, and the like, whether the scanned item is the returned item.

In the case where the return authorization is an unopened item that the customer simply did not want, the system hub 101 may not specifically identify the returned item, but will treat the returned item as one of the plurality of items within the distribution network, and may use the returned item to fulfill another order, without needing to send the particular item to the returns location. The system hub 101 can determine whether it would be more efficient to send a different instance of the item to the returns location and to send the actual returned item to another consumer. using the processes described herein.

The system 100 continues to process items from origination to endpoint in this matter. The process 400 then ends.

Figure 5:
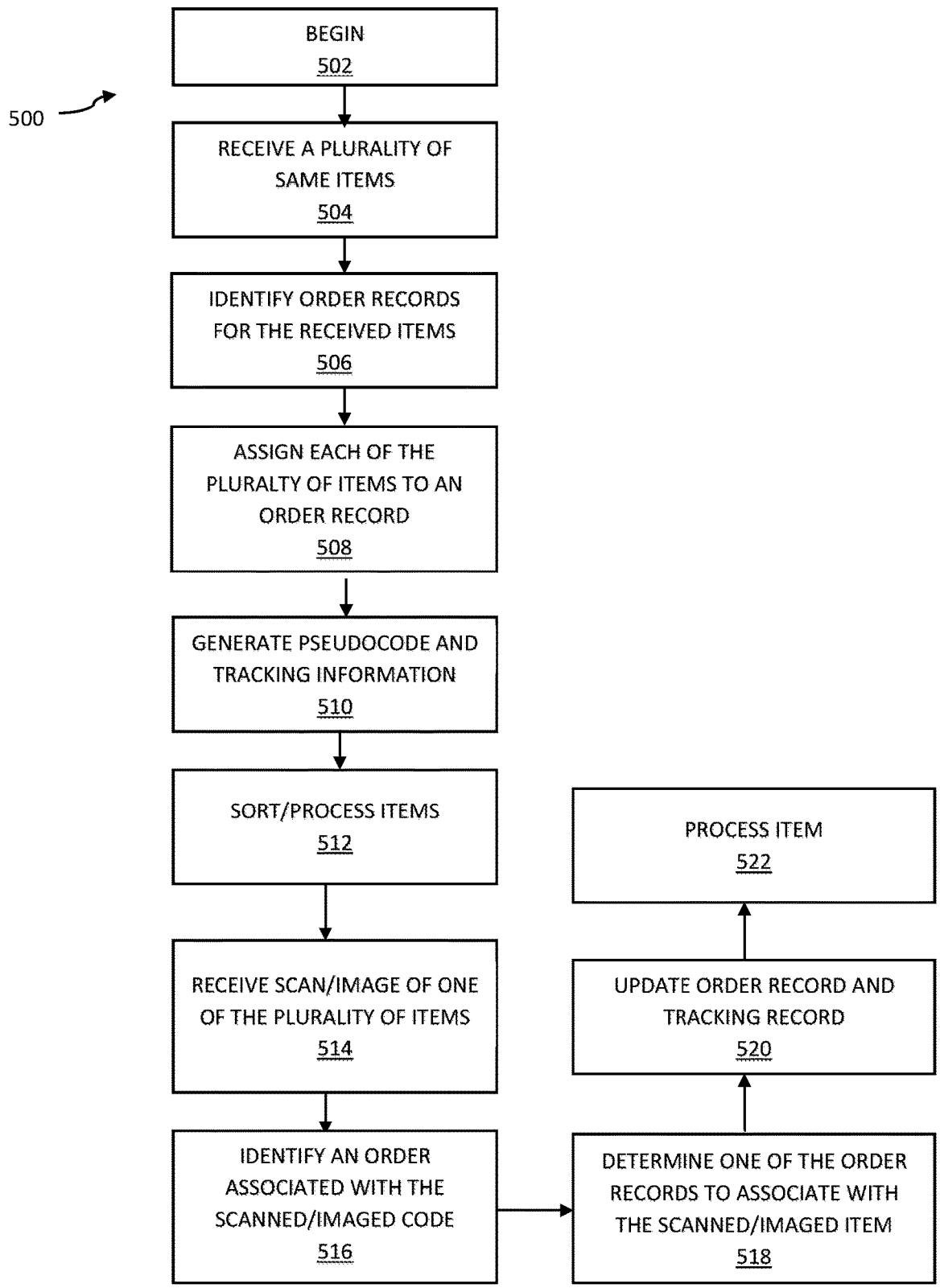
FIG. 5 is an exemplary flow diagram of a process for processing a plurality of items having similar codes thereon.

FIG. 5 is an exemplary flow diagram of a process for processing a plurality of items having similar codes thereon. A process 500 begins in step 502. The process 500 moves to step 504, wherein the distribution network receives a plurality of similar or the same items. The plurality of items received have the same code thereon, e.g., the same UPC or same SKU, indicating they are the same product. The items can be received as a drop shipment, such as a pallet of products at a distribution facility.

The orders and items can be ingested or inducted into the system in a manner similar to the processes described with regard to FIGS. 2-4. After the plurality of items are provided to a distribution network facility, each of the items can be scanned or imaged via item processing equipment 150.

The process 500 moves to step 506, wherein the system hub 101 uses the scanned or read code to identify orders in the order database 130 for the type of item corresponding to the scanned or read code. The order database will have a plurality of orders for the plurality of items.

The process 500 moves to step 508, wherein the system hub 101 assigns or creates an association between each order and the items being scanned. In some embodiments, the association is not a one-to-one association, meaning that the items are not assigned to specific orders, but the order record is updated has having an item in the distribution network to fulfill that order.

In some embodiments, in the case where a code on an item is imaged, the system hub 101 can store the image in the image database 170, and the image database 170 and/or the system hub 101 or another component of the distribution network can process the image to identify unique characteristics in the image of the code. For example, in some embodiments, the packaging on the item can have a marking, a scuff, scratch, ink, or other feature that is visible in the image of the item, and which is unique for that item. That is, no other image of an item having a similar or the same code will have the same pattern of scuffs, markings, handwriting, etc. The system hub 101 can identify the image as corresponding to a specific item, and can create an association between the specific item and the order record. In this way, each item can be specifically associated with an order in the order database and with an intended recipient and delivery point. When the item is processed and imaged on subsequent item processing equipment, the system 100 can identify the specific image based on the unique characteristics, and can route the item according to the specific order with which the item is associated. It is explicitly contemplated that the image recognition process can be used as part of any of the processes described herein.

The order records in the order database 130 are updated as having an item inducted into the system to fill the order. The process 500 moves to block 510, wherein the system hub 101 generates a pseudocode and created tracking records in the tracking database. In some embodiments, the tracking records may not have a one-to-one correspondence with the orders. The pseudocode will correspond to an order number, and to one or more, or all of the tracking records.

The process 500 moves to step 512, wherein the items are processed and sorted on item processing equipment 150. To process the items, the system hub 101 may assign an order or ranking to the order records for the items. The order records can be arranged or ranked in a prioritized order. For example, the order records can be arranged geographically according to the facility where the items are being processed, with the order records having intended delivery points within a certain geographic distance of the facility being prioritized higher on the ranking of order records. The order records can be arranged according to date the order was placed, can be arranged alphabetically, numerically, or in any other desired manner.

When the item processing equipment 150 scans or reads a code on one of the plurality of similar items, the system hub 101 identifies one of the order records corresponding to the scanned or read code. The system hub 101 can identify the first record in the arranged list of order records and use the intended recipient and intended delivery point for the first order in the arranged list of order records for sorting the item. The order record and the tracking database can be updated to indicate that an item associated with the first order on the order record has been processed. For example, if the items are being processed at a facility in Merrifield, Virginia, the system hub 101 arranges order records for that item based on proximity to Merrifield, Virginia. When an item is scanned on Merrifield item processing equipment 150, the system hub 101 uses the intended delivery point closest to the Merrifield facility for the first item scanned. When the second similar item is scanned, the system hub 101 instructs the item processing equipment to route the item according to the order record having the next closest delivery point to Merrifield.

This example is illustrative, and the items can be processed according to order date, that is, those orders which were received first would be associated with the first items scanned, and those orders that were placed later would wait until later items of the similar items are processed.

Based on the identified order record and identified item, the item processing equipment will automatically move one identified item to a first destination within the item sorting equipment and/or in the distribution facility, and a second identified item to a second destination within the item sorting equipment and/or in the distribution facility.

The process 500 moves to step 514, wherein a scan of an item is received subsequent to a first scan or to the scan and sorting described earlier with regard to process 500. The subsequent scan can occur at a different distribution network facility, such as at a local facility or a unit delivery facility.

The process 500 moves to step 516, wherein the system hub 516 identifies the order records associated with the item which are active in the system, and with a specific order record of the order records.

The system hub 101 can identify one or more order records within a geographic area of the subsequent facility. In this case, the system hub 101 may identify a subset of order records from all the order records associated with the scanned code, based on proximity to the facility, or based on another desired characteristic of the intended delivery points in the order records.

The process 500 moves to step 518, wherein the system hub determines one of the order records to assign the scanned item to, and how to route the scanned item to the intended delivery point for the determined order record. If the facility is a local or unit delivery facility, such as a post office, the system hub 101 assigns a first one of the subset of order records with an intended delivery point within the area serviced by the local or unity delivery facility.

The process 500 moves to step 520, wherein the order record in the order database 130 and the tracking record in the tracking database 140 are updated to indicate that an item for the order record has been processed. There need not be a one-to-one relationship between a specific item and a specific order record. In the case of the unit delivery facility, such as a post office, where there is only one of the items to be delivered within the local area, there may be a one-to-one association made.

The process 500 moves to step 522, wherein the items are processed. The processing can be similar to that described elsewhere herein, where the similar items are processed according to intended delivery points and special handling instructions in the order records and the item information.

In the case of a unit delivery facility, where the item is next to be handled by a delivery resource such as a carrier, an address can be applied to the item to assist the carrier in delivering the item to the correct delivery point. In some embodiments, a mobile delivery device can be in communication with the system 100, and can receive information regarding the item and the intended delivery point for the item along the carrier's route. The address can be sent to the mobile delivery device where the carrier can read the address. In some embodiments, the mobile delivery device can have a location coordinate determination system, such as GPS or the like, and when the carrier nears the intended delivery point for the item, the mobile delivery device can alert the carrier that the item is to be delivered to the particular delivery point.

The process 500 continues in a similar manner for subsequent scans on subsequent item processing equipment. The process 500 then ends.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The present disclosure refers to processor-implemented steps for processing information in the system. Instructions can be implemented in software, firmware or hardware and include any type of programmed step undertaken by components of the system.

The one or more processors may be implemented with any combination of general-purpose microprocessors, microcontrollers, digital signal processors (DSPs), field programmable gate arrays (FPGAs), programmable logic devices (PLDs), controllers, state machines, gated logic, discrete hardware components, dedicated hardware finite state machines, or any other suitable entities that may perform calculations or other manipulations of information. The system hub 101 may comprise a processor such as, for example, a microprocessor, such as a Pentium® processor, a Pentium® Pro processor, a 8051 processor, a MIPS® processor, a Power PC® processor, an Alpha® processor, a microcontroller, an Intel CORE i7®, i5®, or i3® processor, an AMD Phenom®, A-Series®, or FX® processor, or the like. The processors described herein typically have conventional address lines, conventional data lines, and one or more conventional control lines.

The system may be used in connection with various operating systems such as Linux®, UNIX®, MacOS®, or Microsoft Windows®.

The system control may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code. The system control may also be written using interpreted languages such as Perl, Python or Ruby.

Those of skill will further recognize that the various illustrative logical blocks, modules, circuits, and algorithm steps described in connection with the embodiments disclosed herein may be implemented as electronic hardware, software stored on a computer-readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored on or transmitted over as one or more instructions or code on a computer-readable medium. The steps of a method or algorithm disclosed herein may be implemented in a processor-executable software module which may reside on a computer-readable medium. Memory Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein a "user interface" (also referred to as an interactive user interface, a graphical user interface or a UI) may refer to a network based interface including data fields and/or other controls for receiving input signals or providing electronic information and/or for providing information to the user in response to any received input signals. A UI may be implemented in whole or in part using technologies such as hyper-text mark-up language (HTML), Flash, Java, .net, web services, and rich site summary (RSS). In some implementations, a UI may be included in a stand-alone client (for example, thick client, fat client) configured to communicate (e.g., send or receive data) in accordance with one or more of the aspects described.

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

What is claimed is:

1. A system for processing a distribution item comprising:
   item processing equipment configured to receive a plurality of distribution items and to image a code on each of the plurality of distribution items, wherein the code on each of the plurality of distribution items is identical, and wherein the item processing equipment comprises a plurality of destination locations therein;
   one or more memories configured to:
      store a plurality of order records, each of the plurality of order records associated with the identical code wherein each of the plurality of order records comprises a delivery location and a delivery time, and wherein each of the plurality of order records is associated with the code and with one of the plurality of distribution items; and
   and
   a processor configured to:
      receive, from the item processing equipment, the image of the code on one of the plurality of distribution items;
      receive, from the item processing equipment, a location identifier and an image time, the location identifier identifying a physical location of the item processing equipment and the image time identifying a time the item processing equipment imaged the code on each of the plurality of distribution items;
      query the one or more memories using the location identifier and the image time;
      identify, in the one or more memories, one order record of the plurality of order records having the delivery location and the delivery time corresponding to the received location identifier and image time;
      obtain, from the identified order record, an intended delivery point; and
      cause the item processing equipment to move the one of the plurality of distribution items to the one of the plurality of destination locations in the item processing equipment associated with the intended delivery point.

2. The system of claim 1, wherein the plurality of codes comprise UPCs or SKUs.

3. The system of claim 1, wherein each of the plurality of order records comprises an indication of whether an additional identifier exists for the associated one of the plurality of distribution items.

4. The system of claim 1, wherein the processor is further configured to determine, whether an additional identifier exists for the identified order record.

5. The system of claim 4, wherein the processor is further configured to cause the item processing equipment to physically apply the additional identifier to an external surface of the one of the plurality of distribution items.

6. The system of claim 5, wherein the additional identifier is an alphanumeric string.

7. The system of claim 5, wherein the additional identifier is an address.

8. The system of claim 1, wherein the processor is further configured to generate a pseudocode and to associate the pseudocode with the identified order record.

9. The system of claim 8, wherein the processor is further configured to receive, from a user via a user interface, the pseudocode, and in response to receiving the pseudocode, provide tracking information for the one of the plurality of distribution items associated with the identified order record.

10. The system of claim 1, wherein the processor is further configured to receive, from a sender interface, the plurality of codes and the plurality of order records.

11. A method for processing distribution items comprising:
   receiving, in item processing equipment, a plurality of distribution items, wherein the item processing equipment comprises a plurality of destination locations therein;
   imaging, in the item processing equipment, a code on each of the plurality of distribution items, wherein the code on each of the plurality of distribution items is identical;
   storing, in one or more memories, a plurality of codes and a plurality of order records, wherein each of the plurality of order records comprises a delivery location and a delivery time, and wherein each of the plurality of order records is associated in the one or more memories of the identical code and with one of the plurality of distribution items;
   receiving, from the item processing equipment, an image of the code on one of the plurality of distribution items;
   receiving, from the item processing equipment, a location identifier and an image time, the location identifier identifying a physical location of the item processing equipment and the image time identifying a time the item processing equipment took the image of the code on each of the plurality of distribution items;

querying, via a processor, the one or more memories using the location identifier and the image time;

identifying one order record of the plurality of order records having the delivery location and the delivery time corresponding to the received location identifier and image time;

obtaining, from the identified order record, an intended delivery point; and moving, via the item processing equipment, the one of the plurality of distribution items to the one of the plurality of destination locations in the item processing equipment associated with the intended delivery point.

12. The method of claim 11, wherein the plurality of codes comprise UPCs or SKUs.

13. The method of claim 11, wherein each of the plurality of order records comprises an indication of whether an additional identifier exists for the associated one of the plurality of distribution items.

14. The method of claim 13, further comprising, determining whether an additional identifier exists for the identified order record.

15. The method of claim 14, further comprising, physically applying, via the item processing equipment the additional identifier to an external surface of the one of the plurality of distribution items.

16. The method of claim 15, wherein the additional identifier is an alphanumeric string.

17. The method of claim 15, wherein the additional identifier is an address.

18. The method of claim 11, further comprising generating a pseudocode and associating the pseudocode with the identified order record.

19. The method of claim 18, further comprising receiving, from a user via a user interface, the pseudocode, and in response to receiving the pseudocode, providing tracking information for the one of the plurality of distribution items associated with the identified order record.

20. The method of claim 11, further comprising receiving, from a sender interface, the plurality of codes and the plurality of order records.

* * * * *